United States Patent
Clarkson et al.

(10) Patent No.: US 6,842,431 B2
(45) Date of Patent: Jan. 11, 2005

(54) METHODS AND APPARATUS FOR CHARACTERIZATION, ADJUSTMENT AND OPTIMIZATION OF WIRELESS NETWORKS

(75) Inventors: Kenneth L. Clarkson, Madison, NJ (US); Karl Georg Hampel, New York, NY (US); John D. Hobby, Piscataway, NJ (US); Paul Matthew Mankiewich, Glen Gardner, NJ (US); Paul Anthony Polakos, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/434,579

(22) Filed: Nov. 4, 1999

(65) Prior Publication Data

US 2003/0147353 A1 Aug. 7, 2003

(51) Int. Cl.[7] .............................................. H04L 12/28
(52) U.S. Cl. ....................................................... 370/254
(58) Field of Search .......................... 370/254, 335–342, 370/465, 252, 433–438, 321; 455/426, 435–446, 67–69, 522, 410–418, 452, 266, 422.1; 375/150, 146–149

(56) References Cited

U.S. PATENT DOCUMENTS

| | | | |
|---|---|---|---|
| 5,023,900 A | | 6/1991 | Tayloe et al. |
| 5,561,841 A | * | 10/1996 | Markus ....................... 455/446 |
| 5,666,648 A | * | 9/1997 | Stuart .......................... 370/321 |
| 5,715,516 A | * | 2/1998 | Howard et al. ........... 455/422.1 |
| 5,826,218 A | | 10/1998 | Khafizov et al. |
| 5,966,094 A | * | 10/1999 | Ward et al. .................. 342/373 |
| 6,122,266 A | * | 9/2000 | Lynch ......................... 370/335 |
| 6,141,565 A | | 10/2000 | Feuerstein et al. |
| 6,167,039 A | * | 12/2000 | Karlsson et al. ............ 370/342 |
| 6,330,429 B1 | * | 12/2001 | He .............................. 455/67.1 |
| 6,377,804 B1 | * | 4/2002 | Lintulampi ................. 455/435 |
| 6,571,089 B1 | * | 5/2003 | Richards et al. ............ 455/266 |

FOREIGN PATENT DOCUMENTS

WO     WO 94/03986     2/1994

OTHER PUBLICATIONS

K. Tutschku et al., "Spatial Traffic Estimation and Characterization for Mobile Communication Network Design," IEEE Journal on Selected Areas in Communications, vol. 16, No. 5, pp. 804–811, Jun. 1998.
K–H. Kim et al., "Development of the CDMA System Performance Analysis Tool(CDAT)," IEEE, vol. 2, pp. 1400–1403, 1996.
P. Newson et al., "An Adaptive Traffice Prediction Algorithm for Cellular Radio Systems," IEEE, vol. 2, pp. 130–134, 1994.
Planet Tool, Mobile Systems International, http://www.rmrdesign.com/msi, 1999.
Asset Tool, Aircom, http://www.aircom.co.uk, 1999.

* cited by examiner

Primary Examiner—Chi Pham
Assistant Examiner—Prenell Jones

(57) ABSTRACT

Improved techniques for characterizing, adjusting and optimizing the overall performance of a wireless network. In an illustrative embodiment, the overall network performance for a particular network configuration is characterized by a vector with two components, one representing network coverage and another representing network capacity. Network coverage is defined by the likelihood of service under load, including interference, and may be further weighted by traffic density. Network capacity is defined by an amount of traffic with a given spatial distribution that can be served at a given overall target-blocking rate. The overall network performance may be characterized using a two-dimensional capacity/coverage diagram which plots overall network performance vectors, each including a network capacity component and a network coverage component, for various network configurations. The overall network performance may be improved or optimized with respect to a given subset of network parameters by using an algorithm that proposes potential network configurations and evaluates them with respect to their overall network performance.

36 Claims, 5 Drawing Sheets

METHODS AND APPARATUS FOR CHARACTERIZATION, ADJUSTMENT AND OPTIMIZATION OF WIRELESS NETWORKS

RELATED APPLICATIONS

The present invention is related to the inventions disclosed in the U.S. Patent Applications of K. L. Clarkson et al. Ser. No. 09/434,580 entitled "Road-Based Evaluation and Interpolation of Wireless Network Parameters" and Ser. No. 09/434,578 entitled "Methods and Apparatus for Derivative-Based Optimization of Wireless Network Performance," both f which are filed concurrently herewith and incorporated by reference herein.

FIELD OF THE INVENTION

The present invention relates generally to wireless communication networks, and more particularly to characterization, adjustment and optimization techniques for use in the design, implementation and operation of such wireless networks.

BACKGROUND OF THE INVENTION

A typical wireless network includes a multitude of interconnected base stations providing wireless traffic to a varying number of fixed or mobile users distributed over a geographically well-defined coverage area. The wireless interface generally has to operate under conditions including demand for multiple access to the network, uncontrollable signal propagation, and a limited bandwidth. The demand for multiple access to the network means that location and time of service requests are not known a priori. Therefore, the network has to provide the required level of service with sufficient capacity over a large geographical area. The above-noted uncontrollable signal propagation condition indicates that a wireless link between a base station and a user relies on signal propagation in an environment that is typically associated with high propagation loss, and reflection, diffraction, or scattering effects at clutter, terrain, and other types of obstacles.

The combination of these conditions often results in competing design goals. For example, demand for high capacity within a limited bandwidth generally requires operating with high spectral efficiency. This leads to reduced orthogonality among communication channels, resulting in mutual interference due to their overlapping propagation paths in the environment. This interference reduces network coverage area or, equivalently, lowers quality of service. Therefore, the requirement for high area coverage or high quality of service always competes against the demand for high network capacity.

In time division multiple access (TDMA) or frequency division multiple access (FDMA) systems, spectral efficiency can be increased by reducing the frequency reuse factor. This also reduces the average physical distance between cells operating at the same frequency and therefore increases their mutual interference. In code division multiple access (CDMA) systems, the various communication channels are distinguished by codes. Due to propagation effects in the environment, orthogonality between codes may be washed out, such that interference between communication channels increases with traffic load.

Besides spectral efficiency, the amount of traffic that can be handled by the network highly depends on how well the spatial distribution of capacity matches that of the offered traffic load. This sets an additional constraint on allocating and sizing cells in the network, which, of course, is highly dependent on the local propagation environment.

Other constraints that can influence network performance include, e.g., time-dependent variations of the traffic pattern, hardware limitations, external interference effects like thermal noise, morphological issues like requirements for building penetration, etc.

A multitude of other system parameters also have to be considered when a network is designed or adjusted. These parameters include, e.g., base station locations, number of sectors per base station, antenna parameters such as height, orientation, tilt, antenna gain, and antenna pattern, transmit power levels per communication channel and base station, frequency plan, handoff thresholds, number of carriers per base station or sector, etc.

There are underlying constraints associated with some of these parameters, such as base station locations or antenna heights, that may be predetermined by the local morphological environment, e.g., availability of real estate, high buildings for antennas, etc. In addition, certain parameters, such as antenna tilt or antenna orientation, can be easily adjusted in the design phase, but are cost- and time-intensive when they have to be changed afterwards. Other parameters, such as frequency plan, power levels and handoff thresholds, can easily be changed or tuned, even when the network is in service.

As a result of the complexity of the wireless environment, competing design goals such as demand for high capacity and high link performance, and the multitude of system parameters, network design and adjustment are difficult tasks.

Current procedures for network design include design tools that model network performance based on the given network parameters using statistical or other mathematical propagation models. An example of such a design tool is the Planet tool from Mobile Systems International, http://www.rmrdesign.com/msi. These and other convention network design tools calculate certain radio frequency (RF) link metrics, e.g., signal strength or signal-to-interference ratio, which are of significance for particular network performance attributes. The accuracy of these predictions mostly depends on the accuracy of the propagation models and the precision of modeling the environment, e.g., terrain, clutter etc.

Although these conventional tools can provide a sufficiently high accuracy in predicting network performance, they generally do not classify the overall network performance and, therefore, provide no information about how far the network is driven from its optimal state. Due to the complexity of the interactions in the network, tuning network performance has to be done by a trial-and-error procedure, and potential improvements have to be identified by comparing RF link-metric plots for different network configurations. With the number of network parameters that have to be adjusted and the different design goals, this procedure is very unsatisfactory and a performance optimum is difficult to even approach.

Other conventional approaches include frequency planning tools. An example of such a tool is the Asset network design tool, from Aircom, www.aircom.co.uk. The Asset tool includes a frequency planning algorithm. For TDMA and FDMA networks, i.e., networks that have a frequency reuse factor larger than one, many efforts have been made to generate algorithms that improve the network performance with respect to its frequency plan. These algorithms usually have an objective that aims for improvement of spectral efficiency. Such an algorithm, for instance, may try to minimize the amount of frequencies used while serving a given traffic density. These algorithms, however, generally do not provide information about the network performance for each frequency plan, unless they have been linked to a network design tool such as the above-noted PLANET tool.

A well-known conventional approach to network optimization is in-field optimization. Since design tools do not perfectly reflect all propagation effects in the environment, networks can be improved by in-field drive tests. However, drive tests have to be regarded merely as an alternative data acquisition procedure, and inferring network improvements is subjected to the same problems as above. Further, drive-test data can be gained only from limited areas, they are cost and time intensive.

Although many of the above-noted conventional techniques can provide assistance in designing and adjusting a network, they generally do not allow optimization of overall network performance for different mutually competing design goals. A need therefore exists for improved network characterization, adjustment and optimization techniques that can, e.g., unambiguously classify the performance of a wireless network for competing design goals and for different system configurations.

SUMMARY OF THE INVENTION

The present invention provides improved techniques for characterizing, adjusting and/or optimizing the overall performance of a wireless network.

In an illustrative embodiment of the invention, the overall network performance for a particular network configuration is characterized by a vector with two components, one representing network coverage and another representing network capacity. In accordance with the invention, network coverage is advantageously defined by the likelihood of service under load, including interference, and may be further weighted by traffic density. Network capacity is advantageously defined by the amount of traffic with a given spatial distribution that can be served at a given overall target-blocking rate. It has been determined that these definitions provide an accurate and efficient quantification of how well network resources are being used.

In accordance with the invention, the overall network performance may be characterized using a two-dimensional capacity/coverage diagram. The diagram plots overall network performance vectors, each including a network capacity component and a network coverage component, for various network configurations. The diagram thus allows comparison of various network configurations with respect to their overall network performance in a visually very clear and efficient way. It also provides a visual understanding of the tradeoff between the two competing network performance attributes of the illustrative embodiment, i.e., network capacity and network coverage.

In accordance with another aspect of the invention, the overall network performance may be improved or optimized with respect to a given subset of network parameters by utilizing the overall network performance classification based on network capacity and network coverage. This may be done by using an optimization algorithm that proposes potential network configurations and evaluates them with respect to their overall network performance. The corresponding network performance points may be plotted into a capacity/coverage diagram. Those network configurations that form the outer envelope of all configurations considered relevant by the algorithm represent the best tradeoff curve for the network found in this process.

The present invention may be implemented in one or more software programs running on a personal computer, workstation, microcomputer, mainframe computer or any other type of programmable digital processor. The invention substantially improves the process of designing, adjusting and optimizing the performance of wireless networks. These and other features and advantages of the present invention will become more apparent from the accompanying drawings and the following detailed description.

DETAILED DESCRIPTION OF THE INVENTION

The present invention will be illustrated below in conjunction with exemplary wireless network information processing techniques implemented in a computer-based processing system. It should be understood, however, that the invention is not limited to use with any particular type of processing system. The disclosed techniques are suitable for use with a wide variety of other systems and in numerous alternative applications. Moreover, the described techniques are applicable to many different types of wireless networks, including TDMA, FDMA and CDMA networks, with mobile subscriber units, fixed subscriber units or combinations of mobile and fixed units. The term "wireless network" as used herein is intended to include these and other types of networks, as well as sub-networks or other portions of such networks and combinations of multiple networks. The terms "optimize," "optimizing" and "optimization" as used herein should be understood to include any type of improvement in network performance, e.g., an improvement which provides performance deemed to be acceptable for a given application. These terms as used herein therefore do not require any type of true optimum, such as an actual minimum or maximum of a particular performance function.

The present invention is directed to a processor-implemented method and apparatus for characterization, adjustment and/or optimization of a wireless network.

Figure 1:
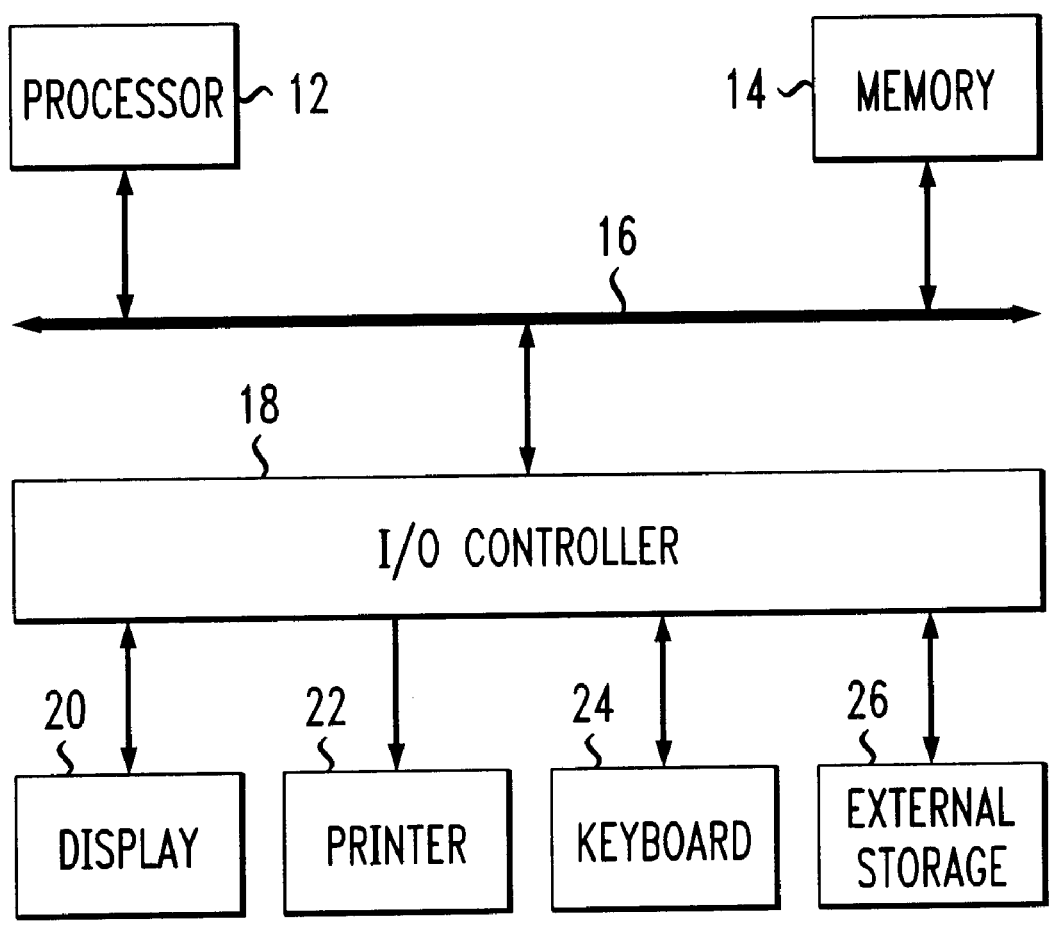
FIG. 1 is a block diagram of a processing system in which a characterization, adjustment and/or optimization process may be implemented in accordance with the invention. The system may be used generate the illustrative graphical displays shown in FIGS. 2A, 2B, 3A, 3B, 4A, 4B and 5.

FIG. 1 shows an exemplary processing system 10 in which characterization, adjustment and/or optimization techniques in accordance with the present invention may be implemented. The processing system 10 includes a processor 12 and a memory 14, connected to communicate via a bus 16. The system 10 further includes an input/output (I/O) controller 18 which is connected to the bus 16 in order to communicate with the processor 12 and memory 14. The I/O controller 18 in conjunction with the processor 12 directs the operation of a number of peripheral components including a display 20, a printer 22, a keyboard 24 and an external storage device 26.

One or more of the elements of system 10 may represent portions of a desktop or portable personal computer, a workstation, a microcomputer, a mainframe computer, or other type of processor-based information processing device. The memory 14 and external storage device 26 may be electronic, magnetic or optical storage devices. The external storage device 26 may include a database of wireless network information, e.g., a database of information on wireless network operating parameters, etc. that is utilized to generate graphical displays that will be described below. The external storage device 26 may be a single device, or may be distributed, e.g., distributed across multiple computers or similar devices. The term "database" as used herein is intended to include any arrangement of stored data that may be used in conjunction with a network characterization, adjustment and/or optimization technique.

The present invention may be implemented at least in part in the form of a computer software program stored in memory 14 or external storage 26. Such a program may be executed by processor 12 in accordance with user-supplied input data to produce a desired output in a predetermined format, e.g., on display 20 or on a print-out generated by printer 22. The user-supplied input data may be entered at the keyboard 24, read from one or more files of external storage device 26, or obtained over a network connection from a server or other information source.

The present invention provides improved techniques for characterizing, adjusting and optimizing the overall performance of a wireless network. In an illustrative embodiment of the invention, the overall network performance for a particular network configuration is characterized by a vector with two components, one representing network coverage and another representing network capacity. In accordance with the invention, network coverage is advantageously defined by the likelihood of service under load, including interference, and may be further weighted by traffic density. Network capacity is advantageously defined by the amount of traffic with a given spatial distribution that can be served at a given overall target-blocking rate. It has been determined that these definitions provide an accurate and efficient quantification of how well network resources are being used.

Figure 2A:
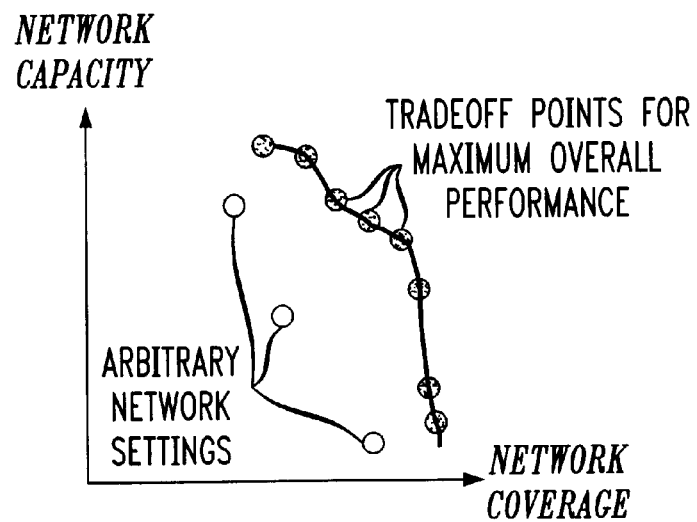
FIG. 2A shows a two-dimensional plot that characterizes overall network performance including a tradeoff curve for determining maximal performance.

FIG. 2A shows an example of a two-dimensional capacity/coverage diagram which may be generated by the system of FIG. 1 in accordance with the invention. The diagram plots overall network performance vectors, each including a network capacity component and a network coverage component, for various network configurations. The diagram thus allows comparison of various network configurations with respect to their overall network performance in a visually very clear and efficient way. It also provides a visual understanding of the tradeoff between the two competing network performance attributes of the illustrative embodiment, i.e., network capacity and network coverage. In the figure, the unshaded circles represent the network performance vectors associated with arbitrary network settings, and the shaded circles represent tradeoff points for maximum overall network performance.

The overall network performance thus may be improved or optimized with respect to a given subset of network parameters by utilizing an overall network performance classification based on network capacity and network coverage. This may be done by using an optimization algorithm that proposes potential network configurations and evaluates them with respect to their overall network performance. The corresponding network performance points are plotted into a capacity/coverage diagram. Those network configurations that form the outer envelope of all configurations considered relevant by the algorithm represent the best tradeoff curve for the network found in this process.

Figure 2B:
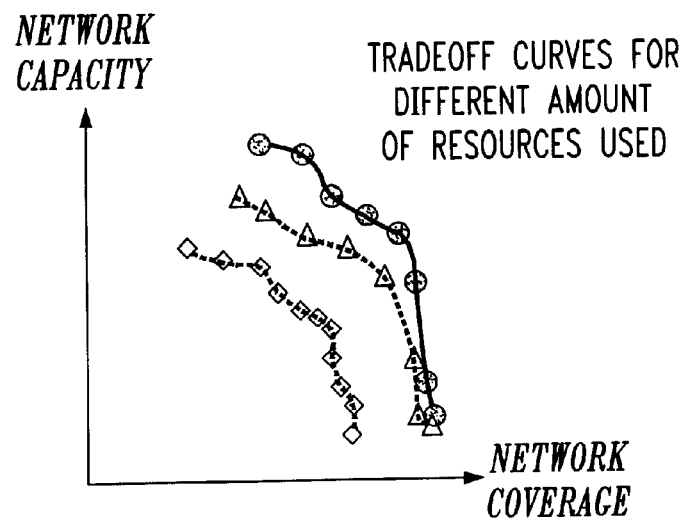
FIG. 2B shows a set of network tradeoff curves generated for different amounts of network resources.

FIG. 2B shows an example set of tradeoff curves generated in this manner, with each of the tradeoff curves corresponding to use of a different amount of network resources, e.g., a different number of cells. The tradeoff curves depict in a very clear way the improvement that can be made to the overall network performance by increasing the amount of resources.

The above-described optimization process in the illustrative embodiment can utilize any algorithm that is capable of determining a sufficient variety of network configurations. For example, the algorithm may be a mathematical optimization algorithm that directly searches for the network configurations leading to the best tradeoff curve. Such an algorithm usually finds better tradeoff curves in a shorter period of time. Alternatively, a mathematical algorithm can be used that tries to optimize for different objectives. For example, a frequency planning algorithm can be used. Each frequency plan produces one point on the tradeoff plot, and the tradeoff curve represents the set of best frequency plans generated by the frequency planning algorithm. As previously noted, an example of such a frequency planning algorithm is that provided by the Asset network design tool, from Aircom, www.aircom.co.uk. Even a routine that alters certain network configurations by a random process can be used.

Since the above-described concept is independent of the particular optimization algorithm used, it represents a methodology for improving and/or optimizing overall network performance. Based on this methodology, more refined algorithms can be developed. The quality of a particular algorithm can be measured by the improvement it can make to a network within the above-described capacity/coverage classification of overall network performance.

The overall bandwidth and other significant network resources should advantageously be constraints for the improvement/optimization process for a particular tradeoff curve. As described above in conjunction with the set of tradeoff curves of FIG. 2B, using different sets of resources, e.g. more base stations or bandwidth, results in different tradeoff curves, which visualized in one plot shows the associated change in overall network performance very clearly. Such a plot also reveals how overall performance differs between various network designs using comparable resources.

It should be noted that the network coverage and network capacity properties in the illustrative embodiment can be replaced by related properties in other embodiments. For example, network coverage can be related to statistical network metrics such as "call origination failures," and network capacity can be related to "overall blocking rate at given traffic load" or simply "blocked call rate." Such properties, as well as other similar properties derived from network statistics, are closely related to network coverage and network capacity, and carry basically the same or similar information. The terms "network coverage" and "network capacity" as used herein are therefore intended to include any such related properties.

An exemplary implementation of the above-described illustrative embodiment will now be described in greater detail. In this implementation, a location is considered covered when a communication link can be properly originated and terminated, and when the link traffic has sufficient link quality during the time when the link is up. These conditions may involve several communication channels with different link requirements.

In an IS-95 CDMA system, for example, the forward link can be considered covered when the strongest pilot has sufficient signal strength with respect to the total interference level, comprising interference from all other communication channels and noise:

$$Ec_{ik}/Io_{ik} \geq \theta_C, \quad Io_{ik} = \sum_{k' \neq k} Etot_{ik} + (1-b) \cdot Etot_{ik} + NF_i \cdot N_0, \quad (1)$$

where $Ec_{ik}$: Pilot power from sector k at antenna port of mobile i.

$Io_{ik}$: Interference power at antenna port of mobile i with respect to pilot from sector k.

$Etot_{ik}$: Total received power from sector k at antenna port of mobile i.

b: Fraction of pilot power to total power of cell or cell sector.

$NF_i$: Mobile noise figure.

$N_0$: Thermal noise floor.

$\theta_c$: Threshold for proper pilot signal recovery.

In the reverse link, coverage is obtained when every mobile can be received with sufficient relative signal strength at the base station:

$$S_{ik}/I_{ik} \geq \theta_{RVS}, \quad I_{ik} = \sum_{j \neq i} S_{jk} + NF_k \cdot N_0, \quad (2)$$

where $S_{ik}$: Signal power from mobile i at antenna port of sector k.

$I_{ik}$: Interference power at antenna port of sector k with respect to pilot from mobile i.

$NF_k$: Mobile noise figure.

$N_0$: Thermal noise floor.

$\theta_{RVS}$: Threshold for proper mobile-signal recovery in reverse link.

A location has coverage when both the forward and reverse link have coverage. These conditions have to be met for each user only with respect to one cell or cell sector, i.e., the strongest server. In the reverse link, additional diversity gain can be obtained from soft-handoff. This gain can be added into the overall link budget.

In accordance with the invention, a coverage function is defined as $$Cov(x, y) = \begin{cases} 0 & \text{if location } (x, y) \text{ is not covered} \\ 1 & \text{if location } (x, y) \text{ is covered} \end{cases} \quad (3)$$

Overall area-weighted coverage can be defined by integrating the coverage function over the target coverage area (TCA):

$$Cov_{tot} = \int_{TCA} Cov(x, y) \cdot dx \cdot dy \bigg/ \int_{TCA} dx \cdot dy. \quad (4)$$

Alternatively, overall traffic-weighted coverage can be defined by:

$$Cov_{tot} = \int_{TCA} TD(x, y) \cdot Cov(x, y) \cdot dx \cdot dy \bigg/ \int_{TCA} TD(x, y) \cdot dx \cdot dy \quad (5)$$

where TD(x,y) assigns a local traffic density function. The overall traffic-weighted coverage better represents the statistical network performance, since it weighs high-traffic areas more than low traffic areas.

The integrals in Equations (4) and (5) can be replaced by sums if a discrete set of locations is evaluated rather than a continuum. The number of locations should be large enough and dense enough for a statistical representative coverage evaluation. Alternatively, the evaluation can be done using a road-based mesh as described in the above-cited U.S. Patent Application of K. L. Clarkson et al. entitled "Road-Based Evaluation and Interpolation of Wireless Network Parameters."

The individual power levels at the receiver input can be obtained, e.g., from conventional network design tools, from in-field measurements, from network performance statistics, or from a combination of these and other techniques.

In accordance with the invention, overall capacity of a network is defined with respect to the spatially varying traffic distribution. This avoids providing too many resources in places where there is no traffic while resources are lacking in high traffic areas. Such a situation would lead to under-use of resources in some areas and to high blocking rates in others.

For networks that are in service, network capacity can be specified with respect to one specific overall target blocking rate, $BR_0$:

$$BR_0 = \frac{\text{Failed attempts to originate a service in target coverage area}}{\text{Total amount of service requests in target coverage area}}, \quad (6)$$

where the failed attempts are service origination failures attributable to an overload of network resources.

Figure 3A:
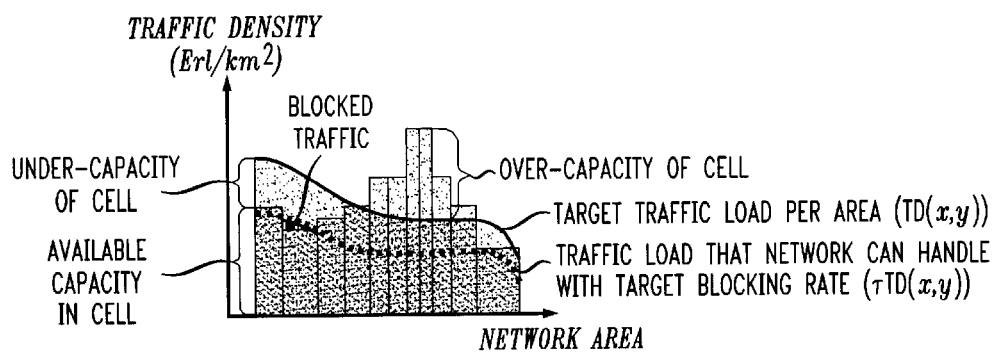
FIG. 3A shows an unoptimized network plot in which the spatial distribution of traffic density and network capacity do not match.
Figure 3B:
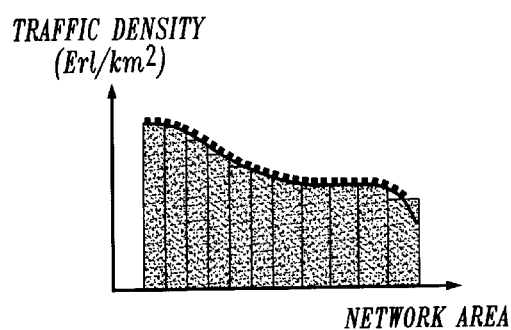
FIG. 3B shows an optimized network plot in which the spatial distribution of traffic density and network capacity do match, such that network capacity is maximal.

FIGS. 3A and 3B show plots of traffic density in Erlangs per square kilometer ($En/km^2$) as a function of network area.

FIG. 3A illustrates a situation in which the above network capacity definition may lead to significantly lower capacity values for a network with a given traffic distribution than those obtained by simply adding up the resources of all cells. In the figure, the spatial distribution of a target traffic load (solid line) is not matched by the spatial distribution of available network capacity (blocks). Therefore, some cells have too little capacity (cells at the left and right), while other cells have over-capacity (cells in the center). In order to keep the overall network blocking rate at a small target value (small "blocked traffic" area), the total traffic has to be reduced significantly (dotted line). In this diagram, simply adding up the capacity of all cells (area of all blocks) would lead to a total capacity value that meets the initial traffic distribution (area under solid line) and is much higher than that obtained using the above network capacity definition.

FIG. 3B illustrates the same situation for an optimized network. Since distribution of capacity and traffic match each other in this case, the traffic that can be handled at the target blocking rate (dotted line) is maximal.

In the following, the situation illustrated in FIG. 3B will be modeled. It will be assumed that there is only one type of service over the entire network. Every cell or cell sector, k, has a particular number of traffic channels, $\Gamma_k$, that can be used for service. This number of traffic channels may be different for each sector. Further, the spatial traffic distribution, TD(x,y), is given and normalized to the target capacity of the network:

$$\int_{TCA} TD(x,y) = TCap,$$

where TCap is the target capacity of the network, and TCA is the target coverage area. This traffic distribution will be given in units of Erlangs.

While the traffic distribution TD(x,y) is normalized to the target capacity, the traffic that can be handled by the network at the overall target blocking rate $BR_0$ is $\tau \cdot TD(x,y)$, which may be significantly lower. The traffic-load multiplier $\tau$ obviously depends on the target blocking rate:=$(BR_0)$.

In every cell or cell sector k, the total traffic load is $\tau \cdot TD_k$:

$$\tau \cdot TD_k = \tau \cdot \int_{C(k)} TD(x,y), \quad (7)$$

where C(k) indicates the coverage area of k, i.e., the area where service requests are handled by k. In accordance with well-known trunking theory, the associated blocking rate $BR_k(\tau TD_k, \Gamma_k)$ for cell or cell sector k is:

$$BR_k(\tau TD_k, \Gamma_k) = \frac{\frac{(\tau TD_k)^{\Gamma_k}}{\Gamma_k!}}{\sum_{n=0}^{\Gamma_k} \frac{(\tau TD_k)^n}{n!}} \quad (8)$$

The amount of blocked traffic in cell or cell sector k, $BT_k(\tau TD_k, \tau_k)$, is the product of cell blocking rate and cell traffic:

$$BT_k(\tau TD_k, \Gamma_k) = \tau TD_k \cdot BR_k(\tau TD_k, \Gamma_k) \quad (9)$$

The total amount of blocked traffic in the entire network is the sum over the blocked traffic in each cell:

$$BT_{tot} = \Sigma_k \tau TD_k \cdot BR_k(\tau TD_k, \Gamma_k) \quad (10)$$

This leads to the total overall blocking rate for the entire network, given by the ratio of the total amount of blocked traffic and the total amount of traffic:

$$BR_{tot} = \Sigma_k \tau TD_k \cdot BR_k(\tau TD_k, \Gamma_k)/\tau TC \quad (11)$$

This equation defines a function $BR_{tot}(\tau)$ from which the traffic multiplier $\tau$ can be found by solving $BR_{tot}(\tau) = BR_0$, where $BR_0$ is an overall target blocking rate.

In the above calculation, $\tau$ represents the capacity of the network at target blocking rate for a given traffic distribution. However, this definition is generally reasonable only for full coverage. For realistic networks that have coverage holes, network capacity is instead defined by:

$$\text{Network capacity} = \tau \cdot \text{Network coverage}, \quad (12)$$

where network coverage is defined as above. This definition represents capacity as the total traffic load that can be served over the target network area at target blocking rate.

Figure 4A:
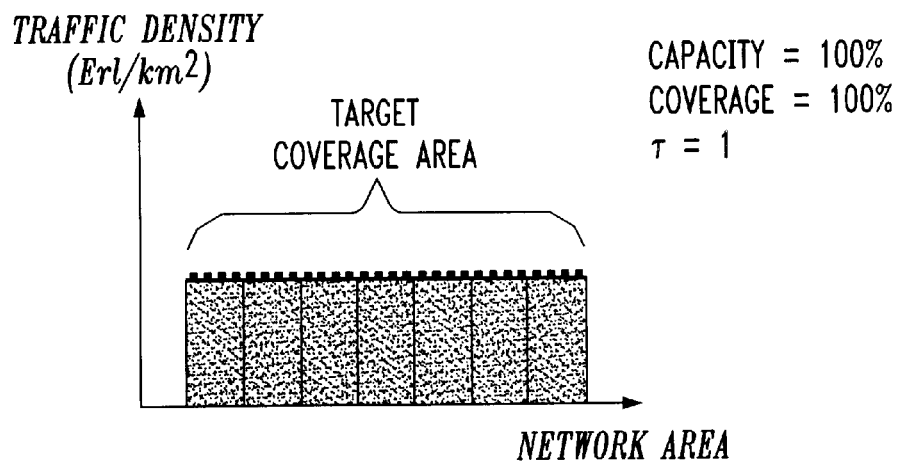
FIG. 4A shows a capacity plot for a network with full coverage.
Figure 4B:
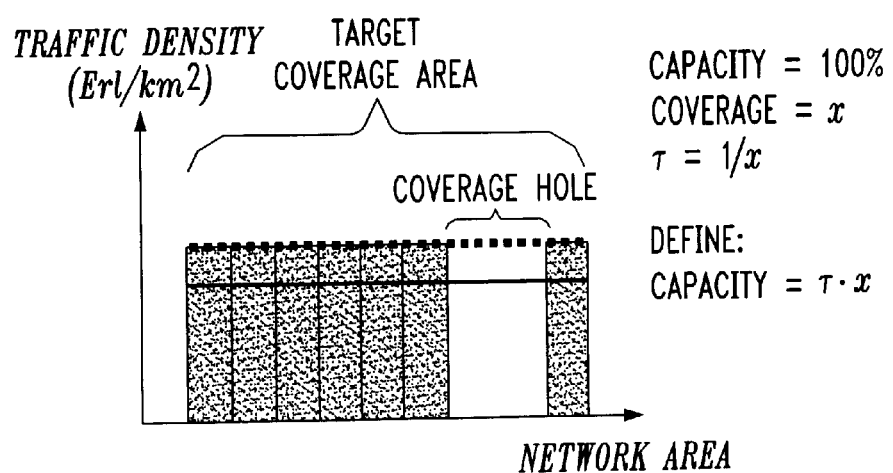
FIG. 4B shows a capacity plot for network with coverage hole.

FIGS. 4A and 4B illustrate the influence of network coverage in this case. These figures show plots of traffic density in Erlangs per square kilometer (Erl/km²) as a function of network area. Both figures show a situation where the distribution of traffic density and offer d capacity per cell match each other perfectly. The capacity should therefore be 100% in both case, as indicated in the figures. In FIG. 4A, both capacity and coverage are 100%, and $\tau=1$ in accordance with Equation (12). In FIG. 4B, however, the network has a large coverage hole, with the coverage in this case being given by x, such that capacity=$\tau \cdot x$ in accordance with Equation (12), or $\tau = 1/x$ if "1" denotes 100% capacity. The unused capacity resources in this area have been redistribute and are available in the covered areas of the network. This increases $\tau$ by 1/coverage (dotted line with respect to solid line). The total amount of traffic that can be served, however, has not been increased. To account for this, network capacity should be defined in accordance with Equation (12).

It should be noted that in order to determine the amount of traffic that has to be handled by a cell or cell sector, the coverage area of each cell of cell sector, C(k), has to be known.

In the IS-95 CDMA standard, a user can be assigned to a cell or cell sector if the condition of Equation (1) it met in the forward link. If this condition is met for several cells or cell sectors, the user is in soft handoff, i.e., uses resources from all of these cells or cell sectors. In general, a user in an IS95 network can be assigned to a maximum of three cells. The coverage area C(k) in such a network therefore defines the area where the pilot of k is among the three strongest pilots that meet the condition of Equation (1).

As mentioned previously, the individual pilot level can be obtained from network design tools, from in-field measurements or from a combination of these and other techniques.

In order to determine the overall performance vector for one particular network configuration, the corresponding overall performance point can be found by calculating coverage and capacity as described above.

In general, any objective function can be used in conjunction with any optimization procedure to optimize the network in the manner described above.

To directly optimize the overall network performance in the framework of the above classification, two competing objective functions have to be addressed simultaneously. Such an optimization procedure will lead to a tradeoff curve in the capacity/coverage diagram that represents the best performance in this classification the optimizer could find. Within the optimization process, this goal can be obtained by optimizing for one of the two objective functions, e.g., coverage, and keeping the other one, e.g., capacity, as a constraint. By repeating this procedure for various values of the constraint, the optimization will lead to the desired tradeoff curve.

In order to obtain a point on the tradeoff curve, a new objective may be defined as follows:

New Objective=$\alpha \cdot$Coverage+$(1-\alpha) \cdot$Capacity, $\alpha \in [0,1]$.

Optimizing for the new objective will lead to a point on the tradeoff curve. Repeating this procedure for different values of $\alpha$ will provide the full tradeoff curve.

Two possible implementations of the above-describe optimization procedure, i.e., a Monte Carlo process and an optimization using a frequency planning tool, will now be described.

In the Monte Carlo process, RF link metrics of a network under traffic are evaluated for one particular set of network parameters, e.g., an initial configuration, using a conventional design tool. This evaluation may be done on a geographical grid. The number of grid points should be dense enough for statistically significant representation of the network performance. From all RF link metrics data on this grid and the initial network configurations, the overall network performance is calculated in accordance with the above-described classification. The resulting overall-network performance point is plotted into the capacity/coverage plot.

At least a subset of the tunable network parameters that are subjected to the optimization process are altered within a random process. The RF link metrics are recalculated with the design tool for each random set of network parameters. The overall network performance is evaluated as above and plotted into the capacity/coverage plot. The outer envelope of all overall performance points defines the tradeoff gained in this optimization procedure.

Figure 5:
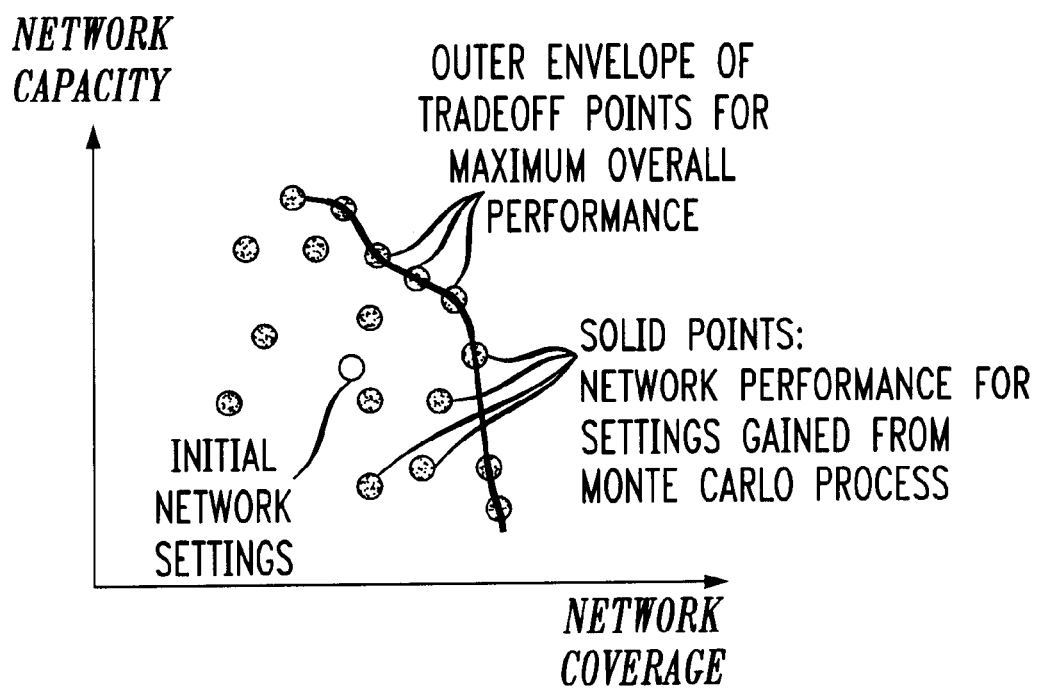
FIG. 5 shows a plot illustrating over network performance points for various network configurations obtained in a Monte Carlo process in accordance with the invention.

FIG. 5 shows an example of a plot of overall network performance points for various network configurations obtained in the above-described Monte Carlo process. The outer envelope forms the optimum tradeoff gained in this process. The unshaded circle represents initial network settings.

As noted above, another possible implementation is an optimization using a frequency planning tool. In order to optimize a network with respect to its frequency plan, a design tool can be used in conjunction with a frequency-planning algorithm (e.g., the above-noted Asset frequency planning tool). For each frequency plan, the RF link metrics are calculated over a sufficiently fine grid using the design tool. From each grid of RF link metrics, overall network performance is determined in accordance with the above classification. From the set of resulting points, the optimum tradeoff is determined in the manner previously described.

A tradeoff curve can be determined in the following manner. Assume a set of points is given in the overall-performance plot (e.g., FIG. 5). This set of points may be the result from an optimization algorithm. The tradeoff curve, representing the points for best network performance, can be found by the following algorithm:

```
/* There are n points in the set, each point carrying one unique index
i = 1, . . . , n.
/* The associated values for network coverage and network capacity are
(Cov_i, Cap_i).
/* The following simple loop structure finds the tradeoff curve:
for(i = 1; i ≤ n; i+ = 1)
{
for(j = 1; j ≤ n; j+ = 1)
   {
   if ((Cov_j <Cov_i) ∧  (Cap_j < Cap_i)) {Cov_j = 0; Cap_j = 0}
   }
}
```

The remaining non-zero points form the above-noted tradeoff curve.

An exemplary derivative-based optimization process in accordance with the invention will now be described in detail. This optimization process optimizes the performance of a wireless network with respect to a multitude of mathematically continuous network parameters for an objective addressing an overall network performance metric.

This objective in this optimization process is formulated as a mathematical or numerical function of a set of network tuning parameters that are considered variables to the optimization process. In accordance with the invention, the optimization process may be based on exact or approximate first or higher order derivatives of the objective function with respect to the network tuning parameters. This leads to reliable results since the tuning parameters are mathematically continuous and the overall network performance metric is locally differentiable, i.e., small changes of parameter settings cause only small changes in network performance. Examples of numerical optimization programs suitable for use in conjunction with the present invention include, e.g., the programs described in Robert Fourer, David M. Gay, Brain W. Kemigham, "AMPL—A Modeling Language for Mathematical Programming," The Scientific Press (1993), Philip E. Gill, Walter Murray and Michael A. Saunders, "SNOPT: An SQP Algorithm for Large-Scale Constrained Optimization," NA97-2, Dept. of Math., UC San Diego (1997), and Philip E. Gill, "User's Guide for SNOPT 5.3: A Fortran Package for Large-Scale Nonlinear Programming," 1997.

If the mathematically continuous network parameters actually have discrete settings in practice with sufficiently small step size, these settings can be obtained after the optimization process by rounding the settings of the optimum configuration. This rounding procedure should not affect the overall network performance significantly, since the overall network performance is continuous with respect to the variables and the maximum or minimum is therefore smooth.

The above-described optimization process has a number of advantages. For example, by writing the overall network performance as a function of a multitude of tuning parameters, their interdependent effect on the network performance is captured and considered in the optimization process. Another advantage is that using the analytical behavior of the overall network performance metric with respect to the network tuning parameters allows standard optimization algorithms to be exploited so as to attain optimal overall network performance.

Examples of objectives that can be optimized in the above-described optimization process are the following:

1. Maximization of network coverage. As noted previously, network coverage may be defined by the fraction of area having local coverage, and can further be weighted by traffic density. Local coverage may be defined by the likelihood of service at a certain location under load, including interference.

2. Maximization of network capacity. As noted previously, network capacity may be defined by the amount of traffic with a given spatial distribution that can be served at a given overall target-blocking rate.

3. Minimization of network resources. This type of objective can address any type of network resources.

4. Any combination of two of the above objectives, forming a one-dimensional solution space of optimal configurations. The solution space can be plotted as a curve in a two-dimensional plot, representing the tradeoff between both objectives, e.g., in the manner illustrated in FIGS. 2A and 2B.

5. Any objective that is directly related to one of the above objectives. For example, "overall blocking rate at given traffic load" relates to network capacity since a monotonic function of one can be described as a monotonic function of the other.

Examples of network tuning parameters that can be used in the optimization process include the following:

1. Antenna parameters, e.g., location, height, orientation, tilt, azimuth & elevation beamwidth.

2. Power levels per communication channel and link.

3. Handoff thresholds.

4. Number of channel units per cell or cell sector (can be treated as continuous if number is sufficiently large).

5. Link-dependent cost of goods, e.g., required power per power amplifier, etc.

The optimization may be done for a large set of these parameters, e.g., antenna tilts of all cell sectors, etc. This allows their interdependent effects on the overall network performance to be captured and considered in the optimization procedure.

All parameters that are not variables should be treated as constants to the optimization process, e.g., fixed network parameters, parameters associated with propagation in the environment, spatial traffic distribution, communication standard, etc. For each of the above objectives chosen for the optimization process, the other objectives should be treated as constraints. For example, network coverage can be optimized for a given overall traffic served, which constrains network capacity, etc. Furthermore, the range of all tuning parameters is preferably constrained to the actual range these parameters can or should be operated in.

Modeling the functional dependence between a given objective and the network tuning parameter variables involves propagation effects, mutual interactions between communication channels, and standard-specific parameters. Since the overall network performance metric captures time-averaged network performance, statistical models can be used to formulate propagation effects and mutual interactions. Such models have been described in general terms for conventional network design tools and can therefore easily be developed for a particular network. Propagation prediction can be improved by, e.g., ray-tracing models, or by incorporating actual in-field measurements.

The optimization algorithm itself may be, e.g., any conventional algorithm that optimizes a numerical or mathematical function based on exact or approximate first or higher order derivatives. The derivatives can be calculated numerically or analytically.

An illustrative implementation of the above-described derivative-based optimization process will now be described.

In this implementation, a network coverage objective is defined as follows. A location is considered covered when a communication link can be properly originated and terminated, and when the link traffic has sufficient link quality during the time when the link is up, i.e., local coverage exists. These conditions may involve several communication channels with different link requirements.

Network capacity and network coverage objectives in this exemplary implementation of the derivative-based optimization process may be defined in the manner described previously in conjunction with the tradeoff of network coverage with network capacity.

A network resources objective can be defined in the following manner. There can be various resources that are minimized. For example, the total hardware costs for power amplifiers, represented by the power-level requirements per cell sector or cell, may be minimized. In an IS-95 CDMA system, the power-level requirement per sector is given by the number of traffic channels and their average power level $P_{Traffic}$, and the overhead needed for pilot, synch, and paging channels, $P_{pilot}$, $P_{Synch}$, and $P_{page}$, respectively. The power amplifier can be scaled downy uniformly reducing the power-levels per channel by a factor $\lambda_k$, or by reducing the amount of traffic channels $\Gamma_k$, where the total power is given by:

$$Ptot_k = \lambda_k \cdot (P_{Pilot} + P_{Synch} + P_{Page} + \Gamma_k \cdot P_{Traffic})_k.$$

The cost per power amplifier is a monotonic function of its power $COG_k(Ptot_k)$. This function should be analytical. The costs for power amplifiers in the overall network is:

$$COG_{tot} = \Sigma_k COG_k(Ptot_k).$$

The RF environment may be modeled in the following manner. This example modeling procedure is for an IS-95 CDMA system, and considers links between potential user locations, e.g., mobiles, and base stations or base station sectors.

1. A target coverage area is defined in the environment.
2. A target traffic distribution is defined, given as traffic density per area TD(x,y) (e.g. Erl/km$^2$). This traffic density can be derived from live-traffic data. Preferably, this traffic density is normalized to the target capacity of the network in the target coverage area:

$$\int_{TCA} TD(x,y) \cdot dxdy = TCap$$

3. A grid or a mesh is generated over the target coverage area, with the gird points representing potential or actual user locations. A road-based mesh may be used, as described in the above-cited U.S. Patent Application of K. L. Clarkson et al. entitled "Road-Based Evaluation and Interpolation of Wireless Network Parameters."

a) Grid points index: 1 . . . i . . . n.
   b) Location of grid point: $Y_i = (x_i, y_i)$.

The grid spacing can be varied over the target coverage area, e.g., to account for changes in traffic density.

4. A traffic density is assigned to every grid point: $TD_i = TD(x_i, y_i) \cdot G_i^2$ (Erl), where $G_i$, is a local grid spacing.
5. Every grid point, representing a potential user transceiver, is characterized by:

a) Relevant antenna data, such as height, radiation pattern (azimuth angle, elevation angle), antenna orientation, tilt: $h_i, g_i(\Theta, \phi), \alpha_i, \beta_i$.
   b) Transmit power (Tx-power) level at antenna port: $P_i$.
   c) Total received power (Rx-power) level from base station k at antenna port: $Etot_{ik} = L_{ik} \cdot Ptot_k$
   d) Rx-power level of pilot channel of base station k at antenna port: $Ec_{ik} = L_{ik} \cdot PC_k$, where $L_{ik}$ is a general path-loss factor to be described below.
   e) Thermal noise floor+external interference: $N_0$
   f) Noise floor of user receiver: $NF_i$ 6. Base stations or base station sectors carry index and a location:

a) Base station index: 1 . . . k . . . m.
   b) Base station location: $X_k = (x_k, y_k)$ 7. Every base station or base station sector is characterized by:

a) Relevant antenna data, such as height, radiation pattern (azimuth angle, elevation angle), antenna orientation, tilt: $h_k, g_k(\Theta, \phi), \alpha_k, \beta_k$.
   b) Maximum Tx-power available at antenna port: $Ptot_k$
   c) Tx-power level of pilot channel at antenna port: $PC_k = b_k \cdot Ptot_k$.
   d) Rx-power level of mobile at antenna port: $S_{ik} = L_{ik} \cdot P_i$, where $L_{ik}$ is a general path-loss factor.
   e) Thermal noise floor+external interference, incl. fade margin: $N_0$.
   f) Noise floor of user receiver: $NF_k$.
   g) Maximum number of traffic channels: $\Gamma_k$.

8. Path-loss calculation: A propagation-path-loss matrix $PL_{ik}$ is calculated. $PL_{ik}$ assigns the propagation loss from the antenna connector of the k$^{th}$ base station or sector to the antenna connector of the i$^{th}$ mobile transceiver. The particular model used depends highly on local morphology and topology. Suitable models that predict mean values for the path loss $PL_{ik}$ are described in, e.g., "Cellular System, Design & Optimization," Clint Smith, P. E., and Curt Gervelis, Editor: McGraw-Hill (1996). These models have basically the shape:

$$PL_{ik}=PL_0 \cdot (d_{ik}/d_0)^K,$$

where $PL_{ik}$: Path loss between BS k and mobile location i.

$$d_{ik}=\|X_i-Y_k\|.$$

Using the well-known Hata model, examples of the parameters in $PL_{ik}$ are:

$$PL_0=6.955 \cdot (f_c(MHz))^{2.616} \cdot (h_k(m))^{-1.382}$$

$$d_0=1km$$

$$K=4.49-0.655 \cdot \log_{10}(h_k(m))$$

These parameters represent the path loss for a mobile height of 1.5 meters and an urban environment. For suburban environments, $PL_{ik}$ is reduced by 9.88 dB and for rural areas by 28.41 dB. As part of this step, a general path-loss matrix $L_{ik}$ is determined that includes, besides the path loss, all parameters in the link budget from the antenna connector at BS k to the antenna connector at mobile i. This also includes antenna pattern and gain for the mobile and base station antennas. Since the propagation model in this example is a statistical model, $L_{ik}$ should also include margins for Raleigh fading and log-normal shadow fading, as described in, e.g., "Cellular System, Design & Optimization," Clint Smith, P. E., and Curt Gervelis, Editor: McGraw-Hill (1996), and William C. Y. Lee, "Mobile Communications, Design Fundamentals," $2^{nd}$ edition, John Wiley & Sons, Inc. (1993). The general path-loss matrix is given by:

$$L_{ik}=\Omega \cdot PL_{ik}/(g_k(\Theta-\alpha_k,\phi-\beta_k) \cdot g_i(\Theta-\alpha_i,\phi-\beta_i)).$$

All the fixed loss and gain parameters are summarized by $\Omega$. The azimuth and elevation angels $\Theta$, $\phi$ are defined by: $\cos \Theta=X_i \cdot Y_k$, $\tan \phi=(\hat{h}_k-\hat{h}_i)/d_{ik}$, where $h_k=h_k+H(x_k,y_k)$ and $\hat{h}_i=h_i+H(x_i,y_i)$. Here, $H(x,y)$ is the terrain elevation. More refined terrain effects, such as detraction over hills, can also be included.

9. Assignment of users to sectors is done in the forward link. Soft handoff is neglected for the sake of simplicity. A user i is assigned to sector k if:

$$i \in A_k \Leftrightarrow Ec_{ik}/Io_{ik}=max_l(Ec_{il}/Io_{il}),$$

where $A_k$ is the assignment area of sector k.

10. Calculation of overall coverage is then performed as follows:

a) Forward link: A user has local forward-link coverage if:

$$i \in Bf_k \Leftrightarrow (i \in A_k)^\wedge (Ec_{ik}/Io_{ik}) \geq \theta_C,$$

where $$Ec_{ik}=Pc_{ik}/L_{ik}, Etot_{ik}=Ptot_k/L_{ik}.$$

$$Io_{ik} = \sum_{k' \neq k} Etot_{ik'} + (1-b) \cdot Etot_{ik} + NF_i \cdot N_0.$$

$Bf_k$: Forward-link coverage area of sector k.

b) Reverse link: A user has local reverse-link coverage if:

$$i \in Br_k \Leftrightarrow (i \in A_k)^\wedge (S_{ik}/I_{ik}) \geq \theta_{RVS}$$

where $$S_{ik}=Pmax/max_{i \in A_k}(L_{ik})$$

Pmax: Maximum mobile power level.

This assumes perfect power control in the reverse link. The received power levels from mobiles in the assignment area all the same. Their maximum value is given by the maximum mobile power and the maximum path loss in this sector. Furthermore, $$I_{ik} = \sum_l \sum_{j \in B_{ll}} TD_j \cdot S_{jl} \cdot \frac{L_{jl}}{L_{jk}} + NF_k \cdot N_0$$

where $Bf_k$ is the reverse-link coverage area of sector k.

c) Overall local coverage:

$$i \in C_k \Leftrightarrow (i \in Bf_k \wedge i \in Br_k)$$

This defines the local coverage function:

$$Cov_{ik} = \begin{cases} 0 & \text{if potential mobile } i \text{ is not covered} \\ 1 & \text{if potential mobile } i \text{ is covered} \end{cases}$$

Network coverage $Cov_{tot}$ is given by:

$$Cov_{tot} = \sum_k \sum_i Cov_{ik} \cdot TD_i \Big/ \Big[n \cdot \sum_i TD_i\Big], n: \text{total number of mobiles.}$$

11. Calculation of overall capcity:

$$\tau \cdot TD_k = \tau \cdot \sum_{i \in C_{ik}} TD_i \Rightarrow BR_k(\tau TD_k, \Gamma_k) \Rightarrow BR_{tot}(\tau) \Rightarrow \tau(BR_{tot})$$

as described above. Overall capacity is then defined by: $\tau \cdot Cov_{tot}$.

12. Calculation of resources: As given above, $$Ptot_k=\lambda_k \cdot (P_{Pilot}+P_{Synch}+P_{Page}+\Gamma_k \cdot P_{Traffic})_k.$$

This completes the process of modeling the RF environment.

A number of examples of network tuning parameter variables suitable for optimization in this implementation of the derivative-based optimization process will now be described. The following network parameters can be used as variables for the optimization:

1. Antenna data: Height, orientation, tilt: $h_k$, $\alpha_k$, $\beta_k$.
2. Antenna location: $Y_k$.
3. Transmit power levels for various communication channels: $Ptot_k$, $P_{pilot}$, $P_{Traffic}$.
4. Amount of channel units: $\Gamma_k$. Although this is not a continuous parameter it can be treated as such in a mathematical sense.
5. Power amplifier scaling factor: $\lambda_k$ The formulation of the derivative functions will now be described. The derivatives can be handled in a mathematical or numerical fashion. If a numerical treatment is chosen, the derivative may be defined by finite differences as follows:

$$\frac{d}{d\beta_k}Cov_{tot}(\beta_{k0}) = \frac{Cov_{tot}(\beta_{k0} + \Delta\beta_k) - Cov_{tot}(\beta_{k0})}{\Delta\beta_k}.$$

The same or similar formulation can be done for every other objective function and variable in the optimization process.

Since the above-described grid is discrete, mobile assignment to sectors will occur in discrete steps when a variable is changed continuously. To obtain reasonable results for the derivatives, it is generally necessary to choose a sufficiently fine grid and sufficiently large values for $\Delta\beta_k$. This can be checked easily by running the optimization for increasingly finer grid spacings. When the optimization results converge, a sufficiently fine grid spacing has been found for the particular set of $\Delta\beta_k$ values chosen. Alternatively, the derivatives can be determined analytically. Such an implementation based on a road-based interpolation technique is described in the above-cited U.S. Patent Application of K. L. Clarkson et al. entitled "Road-Based Evaluation and Interpolation of Wireless Network Parameters."

In the derivative-based optimization process, the objective function, the constraints, and the derivative functions of the objective function with respect to all network tuning parameter may be generated as, e.g., numerical functions. The resulting functions can be processed by any conventional numerical optimization program that is commercially available in order to perform the optimization. As noted above, examples of numerical optimization programs suitable for use in conjunction with the present invention include AMPL and SNOPT.

The graphical displays of FIGS. 2A, 2B, 3A, 3B, 4A, 4B and 5 may be generated in accordance with, e.g., software program instructions executed by processor 12 of system 10. An appropriately-configured software program in accordance with the invention may, e.g., obtain network parameter data from one or more sources, process the network parameter data in accordance with the optimization process of the invention, and generate a display which plots the resulting network configuration information in a desired format.

The above-described embodiments of the invention are intended to be illustrative only. For example, the above-described techniques can be used to design a wireless network, or to optimize or otherwise improve an existing network that is already under operation. In addition, the invention can be applied to sub-networks, e.g., to designated portions of a given wireless network, and to many different types of networks, e.g., networks with mobile subscriber units or fixed subscriber units or combinations of mobile and fixed units. These and numerous other alternative embodiments within the scope of the appended claims will be readily apparent to those skilled in the art.

What is claimed is:

1. A processor-implemented method for characterizing the performance of a wireless network, the method comprising the steps of:
   determining values for a plurality of network parameters; and
   processing the network parameter values to generate a measure of the performance of the wireless network, the measure including components representative of network coverage and network capacity;
   wherein the network coverage component comprises at least one of an area-weighted network coverage component and a traffic-weighted network coverage component.

2. The method of claim 1 wherein at least a subset of the network parameters comprise link parameters.

3. A processor-implemented method for characterizing the performance of a wireless network, the method comprising the steps of:
   determining values for a plurality of network parameters; and
   processing the network parameter values to generate a measure of the performance of the wireless network, the measure including components representative of network coverage and network capacity;
   wherein the network coverage component is defined at least in part as a fraction of area in which quality of service is above a specified threshold, with respect to a target coverage area.

4. The method of claim 3 wherein the quality of service comprises at least one communication channel in a particular link of the wireless network.

5. The method of claim 1 wherein the network coverage component is weighted in accordance with a weighting factor.

6. The method of claim 5 wherein the weighting factor is representative of traffic density within a particular coverage area.

7. A processor-implemented method for characterizing the performance of a wireless network, the method comprising the steps of:
   determining values for a plurality of network parameters; and
   processing the network parameter values to generate a measure of the performance of the wireless network, the measure including components representative of network coverage and network capacity;
   wherein the network coverage component for a given communication channel of the wireless network is configured to include interference from other communication channels in the wireless network, so as to reflect a reduction of coverage under traffic load.

8. A processor-implemented method for characterizing the performance of a wireless network, the method comprising the steps of:
   determining values for a plurality of network parameters; and
   processing the network parameter values to generate a measure of the performance of the wireless network, the measure including components representative of network coverage and network capacity;
   wherein the network coverage component comprises an overall area-weighted network coverage component defined by:

$$Cov_{tot} = \int_{TCA} Cov(x,y) \cdot dx \cdot dy \bigg/ \int_{TCA} dx \cdot dy,$$

where TCA denotes a target coverage area and Cov(x,y) is a coverage function that assigns a coverage indication to a given Location (x,y).

9. The method of claim 8 wherein the coverage function Cov(x,y) is defined as $$Cov(x,y) = \begin{cases} 0 & \text{if location } (x,y) \text{ is not covered} \\ 1 & \text{if location } (x,y) \text{ is covered} \end{cases}.$$

10. A processor-implemented method for characterizing the performance of a wireless network, the method comprising the steps of:

determining values for a plurality of network parameters; and processing the network parameter values to generate a measure of the performance of the wireless network, the measure including components representative of network coverage and network capacity;

wherein the network coverage component comprises an overall traffic-weighted coverage component defined by:

$$Cov_{tot} = \int_{TCA} TD(x, y) \cdot Cov(x, y) \cdot dx \cdot dy \bigg/ \int_{TCA} TD(x, y) \cdot dx \cdot dy$$

where

TD(x,y) is a local traffic density function and Cov(x,y) is a coverage function that assigns a coverage indication to a given location (x,y).

11. The method of claim 10 wherein the coverage function Cov(x,y) is defined as $$Cov(x, y) = \begin{cases} 0 & \text{if location } (x, y) \text{ is not covered} \\ 1 & \text{if location } (x, y) \text{ is covered} \end{cases}.$$

12. A processor-implemented method for characterizing the performance of a wireless network, the method comprising the steps of:

determining values for a plurality of network parameters; and processing the network parameter values to generate a measure of the performance of the wireless network, the measure including components representative of network coverage and network capacity;

wherein the network capacity component is defined at least in part by an amount of traffic having a given spatial distribution, and represents the ability of the wireless network to match the spatial traffic distribution.

13. A processor-implemented method for characterizing the performance of a wireless network, the method comprising the steps of:

determining values for a plurality of network parameters; and processing the network parameter values to generate a measure of the performance of the wireless network, the measure including components representative of network coverage and network capacity;

wherein the network capacity component further represents an amount of traffic having a given spatial distribution that can be carried by the network with a specified target blocking rate.

14. The method of claim 13 wherein the specified target blocking rate is defined as:

$$BR_0 = \frac{\text{Failed attempts to originate a service in a target coverage area}}{\text{Total amount of service requests in a target coverage area}},$$

where the failed attempts are service origination failures attributable to an overload of network resources.

15. The method of claim 13 wherein the network capacity component is defined as:

Network capacity=τ·Network coverage, where τ is a multiplier to a normalized traffic distribution, and is set to a value such that the corresponding traffic load can be handled by the network at the specified target blocking rate.

16. A processor-implemented method for characterizing the performance of a wireless network, the method comprising the steps of:

determining values for a plurality of network parameters; and processing the network parameter values to generate a measure of the performance of the wireless network, the measure including components representative of network coverage and network capacity;

wherein the network capacity component is defined at least in part by an amount of blocked service requests at a given traffic load.

17. The method of claim 1 further including the step of representing the performance of the wireless network in a two-dimensional diagram which allows visual comparison of different network performance measures generated for a plurality of different network configurations.

18. The method of claim 17 wherein the two-dimensional diagram includes representations of the network performance measures for the plurality of different network configurations so as to illustrate a performance tradeoff among the multiple configurations based on a tradeoff between the network coverage and network capacity components.

19. The method of claim 17 wherein the two-dimensional diagram includes a tradeoff curve for each of the plurality of configurations, each of the tradeoff curves including multiple points each corresponding to a network performance measure generated for the corresponding configuration under a particular network resource constraint.

20. The method of claim 19 wherein an outer envelope of at least a subset of a set of points of the tradeoff curves defines an optimum tradeoff curve between the network coverage and network capacity components for the plurality of network configurations.

21. A processor-implemented method for characterizing the performance of a wireless network, the method comprising the steps of:

determining values for a plurality of network parameters;

processing the network parameter values to generate a measure of the performance of the wireless network, the measure including components representative of network coverage and network capacity; and optimizing the performance of the wireless network using an optimization algorithm that generates proposed network configurations, wherein the proposed network configurations are evaluated using the network performance measure.

22. The method of claim 21 wherein the optimization algorithm comprises a frequency planning tool.

23. The method of claim 21 wherein the optimization algorithm comprises a derivative-based optimization process.

24. A processor-implemented method for characterizing the performance of a wireless network, the method comprising the steps of:

determining values for a plurality of network parameters;

processing the network Parameter values to generate a measure of the performance of the wireless network, the measure including components representative of network coverage and network capacity; and optimizing the performance of the wireless network using an optimization algorithm that determines a network configuration for specified values of at least one of the network coverage and network capacity components of the performance measure.

25. The method of claim 24 wherein the optimization algorithm determines a network configuration for an objective other than a particular network coverage or network capacity.

26. The method of claim 24 wherein the optimization algorithm optimizes a particular one of the network coverage and network capacity components for different constraint values associated with the other component.

27. The method of claim 24 wherein the optimization algorithm optimizes a network performance objective specified as a linear combination of the network coverage component and the network capacity component.

28. The method of claim 27 wherein the network performance objective is specified as:

$$a \cdot \text{Coverage} + (1-a) \cdot \text{Capacity}, \ a \in [0,1].$$

where "Coverage" denotes the network coverage component and "Capacity" denotes the network capacity component.

29. An apparatus for characterizing the performance of a wireless network, the apparatus comprising:
a processor-based system operative (i) to determine values for a plurality of network parameters; and (ii) to process the network parameter values to generate a measure of the performance of the wireless network, the measure including components representative of network coverage and network capacity;
wherein the network coverage component comprises at least one of an area-weighted network coverage component and a traffic-weighted network coverage component.

30. An article of manufacture comprising a computer-readable medium storing one or more software programs for use in characterizing the performance of a wireless network, wherein the one or more programs when executed by a processor perform the steps of:
determining values for a plurality of network parameters; and
processing the network parameter values to generate a measure of the performance of the wireless network, the measure including components representative of network coverage and network capacity;
wherein the network coverage component comprises at least one of an area-weighted network coverage component and a traffic-weighted network coverage component.

31. A processor-implemented method for characterizing the performance of a wireless network, the method comprising the steps of:
determining values for a plurality of network parameters; and
processing the network parameter values to generate a measure of the performance of the wireless network, the measure comprising a vector having at least two dimensions and being representative of the performance of the wireless network for a given set of network resources.

32. The method of claim 31 wherein the vector includes a first dimension corresponding to network coverage and a second dimension corresponding to network capacity.

33. An apparatus for characterizing the performance of a wireless network, the apparatus comprising:
a processor-based system operative (i) to determine values for a plurality of network parameters; and (ii) to process the network parameter values to generate a measure of the performance of the wireless network, the measure comprising a vector having at least two dimensions and being representative of the performance of the wireless network for a given set of network resources.

34. The apparatus of claim 33 wherein the vector includes a first dimension corresponding to network coverage and a second dimension corresponding to network capacity.

35. An article of manufacture comprising a computer-readable medium storing one or more software programs for use in characterizing the performance of a wireless network, wherein the one or more programs when executed by a processor include:
determining values for a plurality of network parameters; and
processing the network parameter values to generate a measure of the performance of the wireless network, the measure comprising a vector having at least two dimensions and being representative of the performance of the wireless network for a given set of network resources.

36. The article of manufacture of claim 35 wherein the vector includes a first dimension corresponding to network coverage and a second dimension corresponding to network capacity.

* * * * *